United States Patent Office 3,472,595
Patented Oct. 14, 1969

3,472,595
DIFFRACTION GRATING SPECTROPHOTOMETER
Shojiro Hashizume, Osaka, Japan, assignor to Shimadzu Seisakusho Ltd., Kyoto, Japan, a corporation of Japan
Filed June 13, 1966, Ser. No. 557,197
Claims priority, application Japan, June 15, 1965, 40/35,665
Int. Cl. G01j 3/42, 3/12
U.S. Cl. 356—96                               8 Claims

ABSTRACT OF THE DISCLOSURE

A spectrophotometer having a pair of gratings mounted on rotatable supports and a movable mirror adapted to be moved so as to first reflect light onto one grating to produce a first wavelength spectra and, as it moves, to allow the light to gradually fall on the second grating. The rotation of the gratings and the movement of the mirror providing a continuous wavelength scanning operation without any interruptions.

---

This invention relates to a diffraction grating spectrophotometer of the multiple-grating type and is particularly concerned with a device for interchanging different gratings employed in such spectrophotometers.

It is well known in spectrophotometry that diffraction gratings, rather than prisms, are often more advantageously utilized for dispersing radiant energy such as infrared radiation. A grating is customarily designed to operate over a specific range of wavelengths. In order to cover a broader spectral region, therefore, it is required to provide a spectrophotometer with more than one grating each having a different number of grooves ruled thereon. With a plurality of gratings, it is necessary to change from one grating to another during the scanning operation to cover the whole region of wavelengths afforded by all the gratings provided. Various devices for interchanging gratings have been proposed.

In one of them, for example, a turntable carrying a plurality of gratings is adapted to be turned about an axis so as to bring a selected one of the gratings into the optical path of the instrument. In such an arrangement, however, the wavelength scanning operation must be interrupted when the gratings are interchanged, and the difference in dispersion between the gratings at a point of interchanging them gives different spectral purities and a discontinuous spectrum. Also, in the prior arrangements, an alignment problem is involved since the central positions of the gratings are always moved for interchange. The position of the grating relative to the radiation beam is of great importance since it affects the incident angle of the beam thereon and consequently the accuracy of the wavelength or wavenumber obtained; and whenever the gratings are interchanged into an operative position, there is always the possibility of misalignment. These problems are all due to the prior art arrangements wherein the centers of the gratings are moved in some way or other for interchange.

It is, therefore, one object of the invention to provide a grating interchange device for use in a diffraction grating spectrophotometer of the multiple-grating type, by which the change from one grating to another can be effected without ever moving their relative central positions.

Another object of the invention is to provide such a device as aforesaid wherein a mirror is adapted to be moved into and out of the path of the radiation beam for selectively directing it toward the required one of the gratings.

Still another object of the invention is to provide such a device as aforesaid which has a good mechanical reproducibility.

A further object of the invention is to provide a diffraction grating spectrophotometer of the multiple-grating type wherein the scanning operation is not interrupted even in the course of interchanging the gratings, so that the spectrum obtained will not break but continue at the point of grating interchange.

In accordance with the invention, a pair of gratings are employed each having a different number of grooves ruled thereon for a different range of wavelengths. The wavelength range of one of the gratings partly overlaps that of the other. A plane mirror is employed for changing from one of the gratings to the other. The mirror is adapted to be selectively movable into and out of the path of the radiation beam and is so disposed relative to the gratings that when positioned in the path of the beam, the mirror reflects the beam and directs it onto one of the gratings, completely shutting off the beam to the other grating, while when the mirror is removed out of the path, the beam advances toward the other grating to strike it. In the course of movement of the mirror out of the optical path, some part of the beam is reflected by that portion of the mirror surface which is still in the beam and hits on one of the gratings while the other part of the beam advances straight to strike the other grating. This means that the two gratings operate at the same time. The wavelength or wavenumber drive mechanism is so arranged that the same wavelengths or wavenumbers are produced by the two gratings at the same time at least in the course of interchanging them. Thus, in accordance with the invention, the change from one of the two gratings to the other can be made without any interruption in the wavelength drive, so that a continuity of the spectrum obtained is assured. Since the gratings are not moved for interchange, the misalignment problem has been solved.

The invention, and its above-stated and other objects, features and advantages will be better understood from the detailed description of preferred embodiments thereof with reference to the accompanying drawings, wherein.

Figure 1:
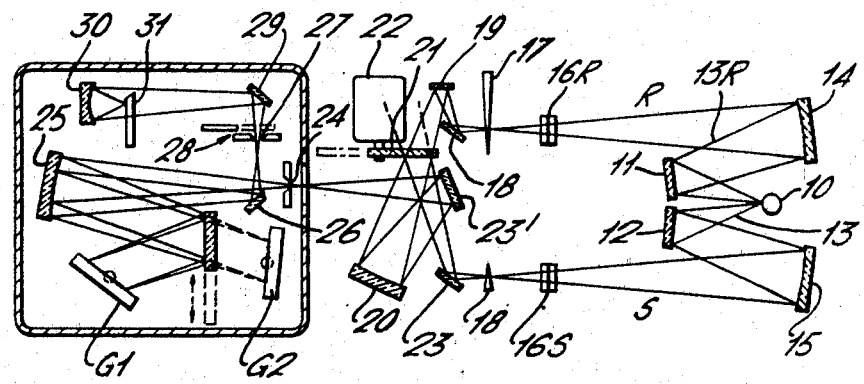
FIG. 1 is an optical layout of a dual grating spectrophotometer embodying the invention.

Referring now in detail to the drawings, first to FIG. 1, it will be seen that the radiation from a source 10 is divided by a pair of mirrors 11 and 12 into two beams 13R and 13S which are reflected by focusing mirrors 14 and 15, respectively. The reflected beams pass through a reference cell 16R and sample cell 16S and then forms first images of the source. At these image points a wedge 17 and a trimmer 18 are inserted in the reference and sample beams 13R and 13S, respectively, for optical attenuation. The reference beam is directed by a pair of plane mirrors 18 and 19 toward a focusing mirror 20. Between the mirrors 19 and 20 is placed a chopper comprising a semicircular disc mirror 21 which is rotated by a motor 22. The sample beam is directed by a plane mirror 23 toward the chopper so that, upon reflection, it follows the same path as the reference beam. It will be seen that as the chopper rotates, the reference and sample beams alternately hit on the mirror 20 at the chopper frequency.

The alternating beam leaving the mirror 20 is reflected by a plane mirror 23 and forms a second image of the source at an entrance slit 24. A collimating mirror 25 collimates the beam from the entrance slit and directs it onto either a first grating G1 or a second grating G2. The diffracted beam is redirected by the mirror 25 toward a mirror 26 and forms an image at an exit slit 27. The radiation from the slit passes through a filter unit 28, reflected by a mirror 29 and finally refocused by a mirror 30 into a detector 31, the output of which is utilized to drive the wedge 17 until a null balance is achieved. The displacement of the wedge is converted into a corresponding movement of a recorder pen (not shown) across a chart (not shown).

Figure 4:
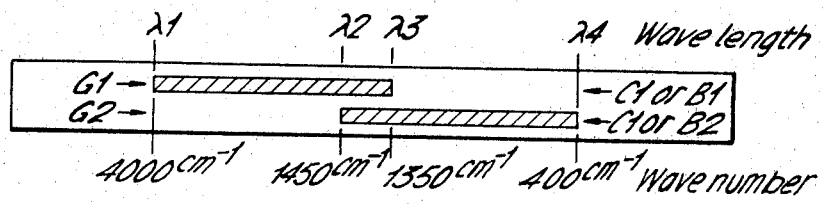
FIG. 4 is a diagram illustrating the different, partially overlapping contiguous ranges of wavelengths or wavenumbers afforded by the two gratings.

The gratings G1 and G2 may be of an echelette reflection type and having a different number of grooves ruled thereon to cover a different range of wavelengths or wavenumbers. Of specific importance is the arrangement that the ranges covered by the two gratings partially overlap. This is schematically shown in FIG. 4. The first grating G1 can cover a wavelength range from $\lambda 1$ to $\lambda 3$, while the second grating can cover a wavelength range from $\lambda 2$ to $\lambda 4$; and $\lambda 3$ is greater than $\lambda 2$. In one practical application to an infrared grating spectrophotometer, the gratings G1 and G2 may be designed to have 150 and 50 grooves per mm., blazed at wavelengths of $4\mu$ and $12\mu$ and cover ranges from 4,000 cm.$^{-1}$ to 1,350 cm.$^{-1}$ and from 1,450 cm.$^{-1}$ to 400 cm.$^{-1}$ in first order, respectively. The combination of the two gratings not only covers a broader wavelength region from 4,000 cm.$^{-1}$ to 400 cm.$^{-1}$, but also enables simultaneous use of the two gratings within the overlapping part of the ranges, in the manner and for the purpose to be described below.

Figure 2:
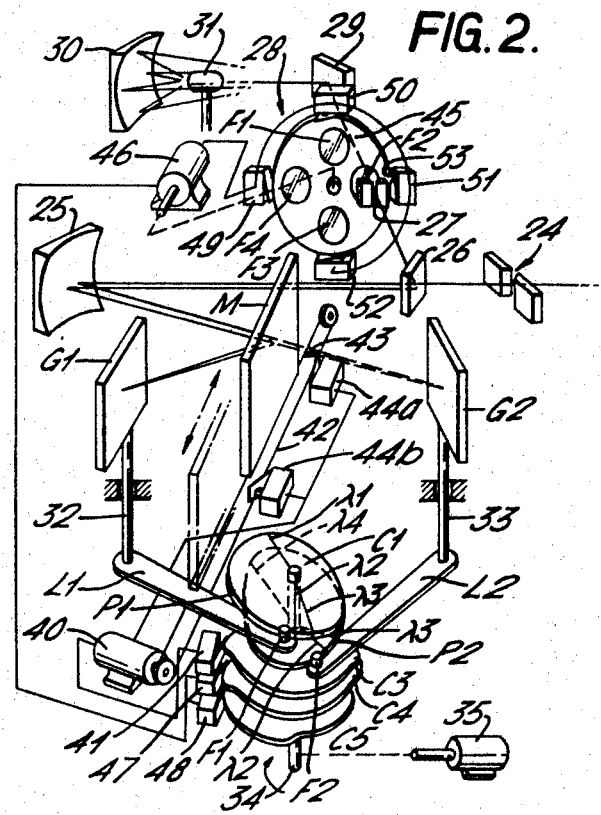
FIG. 2 is a somewhat schematic, perspective view of that portion of the spectrophotometer with which the invention is particularly concerned, illustrating the grating interchange device, wavelength drive, and filter changing mechanism.
Figure 3:
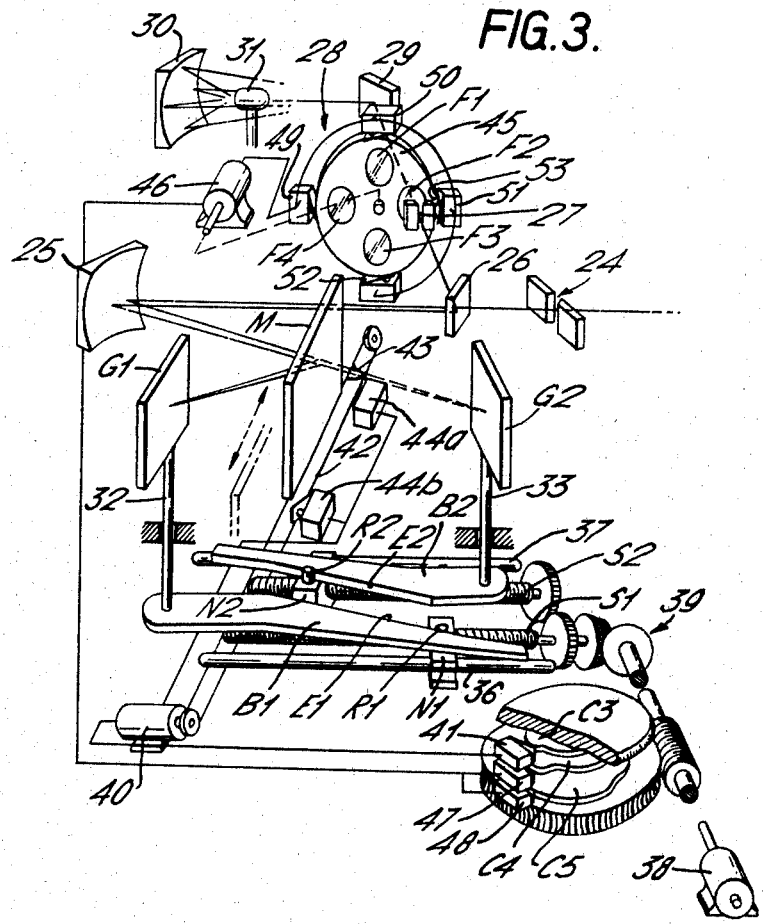
FIG. 3 is a view similar to FIG. 2, but including another form of the wavenumber drive.

Scanning over each of the spectral ranges provided by the two gratings is effected by rotating them about their own axis so as to vary the incident angle of the beam on the gratings. The movement of each grating about its own axis may be controlled by any suitable means such as a cam mechanism as shown in FIG. 2 or a mechanical trigonometric function generator as shown in FIG. 3. The gratings G1 and G2 are rotatably supported by a suitable means schematically shown in these figures as vertical shafts 32 and 33, respectively. In FIG. 3, the gratings G1 and G2 are controlled by cams C1 and C2, respectively, against which are urged cam followers F1 and F2 mounted on levers L1 and L2 which are connected to the shafts 32 and 33, respectively. These cams C1 and C2 are mounted on a common shaft 34 which is rotated by a motor 35, and carry their respective operative profiles P1 and P2, whose spans are defined at opposite ends by the points $\lambda 1$ and $\lambda 3$, and $\lambda 2$ and $\lambda 4$, respectively, in the figure for clarity of illustration. The profiles P1, P2 are so predetermined that as the cam followers F1 and F2, upon rotation of the shaft 34, ride thereon through the whole spans, the corresponding gratings G1 and G2 are rotated about their respective axis with respect to the incident radiation beam so as to scan the wavelength ranges from $\lambda 1$ to $\lambda 3$ and from $\lambda 2$ to $\lambda 4$, respectively. So long as the cam follower F1 rides on the profile P1 between $\lambda 1$ and $\lambda 2$, the grating G1 scans over the corresponding wavelength range and the cam follower F2 is yet on the inoperative periphery of the cam C2. However, the moment the cam follower F1 rides on beyond the point $\lambda 2$, the other cam follower F2 comes to contact the operative profile P2, thereby bringing the grating G2 into operation. Then, the two gratings operate simultaneously until the cam follower F1 passes the point $\lambda 3$, after which the cam follower F2 only rides on the operative surface P2 of the cam C2 and, consequently, the grating G2 only operates. The arrangement must be such that so long as the two cam followers ride in their respective operative cam surfaces between the points $\lambda 2$ and $\lambda 3$, the same wavelength is produced by the two gratings at the same time. This is important in transferring between the two gratings in the manner described hereinafter.

The cam mechanism in FIG. 2 is replaced by a cosecant bar mechanism in FIG. 3, wherein the same reference symbols denote the same parts as in FIG. 2. The supporting shaft for the grating G1 is connected to one end of a cosecant bar B1 having a contact edge E1. The edge is always urged by a suitable means such as a spring (not shown) against a linearly driven member which may be a roller R1 mounted on a nut N1 engaging a precision lead screw S1. In like manner, the second grating G2 is rotated on the shaft 33 by another cosecant bar B2 having an edge E2 in contact with a linearly driven nut N2 having a roller and riding on a lead screw S2. 36 and 37 indicate guide rods for the nuts N1 and N2, respectively. The screw rods S1 and S2 extend in parallel and are simultaneously rotated by a motor 38 through a shaft and gear train connection 39. The contact edges E1, E2 are so contoured as to generate a predetermined different cosecant function such that as the rollers R1 and R2 slide thereon through their respective whole operative lengths upon rotation of the screws S1 and S2, the gratings G1 and G2 are turned to scan over different wavenumber ranges corresponding to the above-mentioned ranges from $\lambda 1$ to $\lambda 3$ and $\lambda 2$ to $\lambda 4$, respectively. In this case, too, the arrangement must be such that between the points $\lambda 2$ and $\lambda 3$ the two gratings produce the same wavenumber at the same time.

Characteristic of the invention is the fact that the central positions of the gratings G1 and G2 are never moved for interchange and that the interchange can be made without stopping the wavelength driving operation. This is achieved by providing a slidable plane mirror M as shown in FIGS. 2 and 3. The mirror M is mounted for movement between two positions illustrated in real and broken lines, respectively, which positions will be referred to as positions A and B, respectively. For moving the mirror M, any suitable mechanism may be employed, but a belt and pulley drive rotated by a motor 40 is somewhat schematically illustrated only by way of example. The motor is actuated by a microswitch 41 which is in turn actuated by a grating selection cam C3 included in the wavelength driving mechanism. Upon rotation of the motor 40, the belt 42 moves the mirror M away from position A until an actuator 43 fixed to the belt actuates the microswitch 44b to stop the motor, whereupon the mirror M is stopped at position B. A similar microswitch 44a is provided to stop the motor 40 when the mirror has been transferred from position B into position A. While in position A, the mirror M is in the path of the radiation beam leaving the collimator mirror 25, thereby completely preventing the beam from reaching the grating G2, but reflecting the beam to strike the first grating G1. The beam dispersed by this grating G1 is reflected by the mirror M back to the collimating mirror 25. When the mirror M has been moved into position B, it is completely out of the path of the beam leaving the collimator mirror 25, so that it can go straight onto hte second grating G2. In this manner, the interchange of the two gratings is accomplished without ever moving the positions of the gratings relative to the radiation beam, so that misalignment problem has been completely solved.

It will be seen that during the course of movement of the mirror M away from position A, a decreasing surface area of the mirror M remains in the path of the radiation beam. This means that a decreasing portion of the radiation is still reflected by that area of the mirror M which is still in the beam so as to impinge on the first grating G1, while the remainder portion, which is increasing, of the radiation beam is now received by the second grating G2. In other words, the two gratings operate simultaneously until the mirror M has been completely removed out of the path.

It should be recalled that within the wavelength range from $\lambda 2$ to $\lambda 3$ the two gratings produce the same wavelength at the same time. Therefore, if the movement of the mirror M is commenced and completed within this range, the two gratings cooperate to produce the same wavelength at the same time; and so contoured is the cam C3 as to enable this. Consequently, the interchange between the two gratings can be conducted without any interruption in the scanning operation.

The filter unit 28 is provided to remove spectra of unwanted higher orders. There are shown four filters F1 to F4 circumferentially arranged on a disc 45 rotated by a motor 46 through a suitable connecting mechanism. The filters may be multi-layer interference filters and are used in their respective wavelength ranges within the overall region from λ1 to λ4. Selective positioning of the filters into the optical path is controlled by microswitches 47, 48, 49, 50, 51, and 52. The microswitches 47 and 48 are operated by cams C4 and C5, while the rest four, by a cam projection 53 on the periphery of the rotary disc 45. The cams C4 and C5 are rotated simultaneously with the cams C1 and C2 or cosecant bars B1 and B2. The on- and off-conditions of the two microswitches 47 and 48 are combined by the cams C4 and C5 to provide four conditions, that is, on-on, on-off, off-on and off-off, which conditions are utilized as four signals to actuate the motor 46 to rotate the disc 45 for a quarter of a revolution; and the four switches 49 to 52 correspond to the four signals and, when actuated by the cam projection 53 with the presence of the corresponding one of the signals, stop the motor 46 and consequently the disc 45 so as to put the corresponding one of the filters F1 to F4 into the beam leaving the exit slit.

The operation of the apparatus will be apparent from the foregoing description, so that no further description thereof will be necessary.

Some preferred embodiments of the invention having been illustrated and described above, it is understood that the invention is not limited thereto, and that various modifications may be made without departing from the true scope of the invention. For example, in the illustrated embodiments, the mirror M is shown movable horizontally, but it may be vertically and otherwise movable for positioning in and out of the optical path of the instrument.

What I claim is:

1. In a diffraction grating spectrophotometer comprising first and second gratings mounted for rotation about their respective axes to provide different, partly overlapping contiguous ranges of wavelengths, the first of said gratings being directly in the optical path of the spectrophotometer and the second being spaced and angularly disposed from the first and said optical path; a grating interchange device comprising: optical reflecting means movable for selective positioning in and out of the optical path of the spectrophotometer for selectively directing a radiation beam to be diffracted from one of said gratings to the other of said gratings; means for causing both said gratings to simultaneously provide the same wavelength within said overlapping portion of said wavelength ranges; and means for controlling the movement of said optical reflecting means so that said movement occurs in the course of scanning said overlapping portion of wavelength ranges.

2. The device as defined in claim 1, wherein said optical reflecting means comprises a plane reflecting mirror.

3. In a diffraction grating spectrophotometer comprising first and second gratings, the first of said gratings being directly in the optical path of the spectrophotometer and the second being spaced and angularly disposed from the first and said optical path; wavelength driving means for rotating said gratings about their respective axes to provide different, partly overlapping contiguous ranges of wavelengths; a grating interchange device comprising: a plane mirror; means for slidably supporting said mirror; means for selectively moving said mirror into and out of a position in the optical path of the spectrophotometer so that a radiation beam to be diffracted is gradually directed from one of said gratings to the other of said gratings; means incorporated into said wavelength driving means for causing both said gratings to simultaneously provide the same wavelength within said overlapping portion of said wavelength ranges; and means connected to with said wavelength driving means for controlling the movement of said plane mirror so that said movement occurs in the course of scanning said overlapping portion of said wavelength ranges.

4. A diffraction grating spectrophotometer comprising: a radiation source; means for forming a beam of radiation from said source; entrance slit means; means for collimating the beam from said entrance slit means; first and second gratings rotatable about their axes to provide different, partly overlapping contiguous ranges of wavelengths, the first of said gratings being directly in the optical path of the spectrophotometer and the second being spaced and angularly disposed from the first and said optical path; optical reflecting means movable for selective positioning in and out of said beam from said collimating means, for selectively directing the beam to either or both of said gratings; means for controlling the rotation of said gratings about their axes to scan the respective wavelength ranges; means incorporated into said control means for causing both said gratings to provide the same wavelength within said overlapping area of said wavelength ranges; means connected to with said control means for controlling the movement of said optical reflecting means so that said movement takes place in the course of scanning said overlapping wavelength area; exit slit means for receiving the diffracted beam from said gratings; and means for detecting the radiation from said exit slit means.

5. The spectrophotometer as defined in claim 4, further including filter means positioned in the path of the radiation beam from said exit slit means to remove spectra of unwanted higher orders.

6. The spectrophotometer as defined in claim 4, wherein said optical reflecting means comprises a plane mirror.

7. The spectrophotometer as defined in claim 4, wherein said wavelength control means comprises a pair of cam mechanisms for controlling the rotation of said gratings, respectively.

8. A diffraction grating spectrophotometer comprising a radiation source; means for forming a beam of radiation from said source; entrance slit means; means for collimating the beam from said entrance slit means; a pair of gratings rotatable about their axes to provide different, partly overlapping contiguous ranges of wavelengths, one of said gratings being disposed in the path of said beam from said collimating means while the other is disposed laterally of said path; a plane mirror; means for slidably supporting said mirror; means for moving said mirror selectively into and out of said path between said collimating means and said one grating, for gradually directing the beam from one of said gratings to the other of said gratings; means for controlling the rotation of said gratings about their axes to scan the respective wavelength ranges; means incorporated into said control means for causing both said gratings to provide the same wavelength within said overlapping area of said wavelength ranges; means connected to with said control means for controlling the movement of said plane mirror so that said movement takes place in the course of scanning said overlapping wavelength area; exit slit means for receiving the diffracted beam from said gratings; filter means positioned in the path of the beam passing through said exit slit means; and means for detecting the beam passing through said filter means.

References Cited

UNITED STATES PATENTS

| | | |
|---|---|---|
| 2,613,572 | 10/1952 | Mathieu. |
| 3,144,498 | 8/1964 | Alpert et al. |
| 3,216,315 | 11/1965 | Keller. |
| 3,306,158 | 2/1967 | Makabe et al. |
| 3,334,956 | 8/1967 | Staunton. |
| 3,390,604 | 7/1968 | Makabe. |

RONALD L. WIBERT, Primary Examiner

F. L. EVANS, Assistant Examiner

U.S. Cl. X.R.

350—162; 356—100